United States Patent
Olesen

(10) Patent No.: US 10,378,512 B2
(45) Date of Patent: Aug. 13, 2019

(54) WIND TURBINE OPERATING METHOD AND DEVICE BASED ON LOAD AND ACCELERATION MEASUREMENTS IN THE BLADE

(71) Applicant: VESTAS WIND SYSTEMS A/S, Aarhus N (DK)

(72) Inventor: Ib Svend Olesen, Randers (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 596 days.

(21) Appl. No.: 14/908,879

(22) PCT Filed: Jul. 4, 2014

(86) PCT No.: PCT/DK2014/050200
§ 371 (c)(1),
(2) Date: Jan. 29, 2016

(87) PCT Pub. No.: WO2015/014366
PCT Pub. Date: Feb. 5, 2015

(65) Prior Publication Data
US 2016/0186722 A1 Jun. 30, 2016

(30) Foreign Application Priority Data
Jul. 30, 2013 (DK) ................................ 2013 70419

(51) Int. Cl.
*F03D 1/06* (2006.01)
*F03D 7/02* (2006.01)
(Continued)

(52) U.S. Cl.
CPC ......... *F03D 7/0232* (2013.01); *F03D 7/0224* (2013.01); *F03D 7/048* (2013.01);
(Continued)

(58) Field of Classification Search
CPC ...... F03D 7/0232; F03D 7/022; F03D 7/0224; F03D 7/0292; F03D 7/048; F03D 17/00
See application file for complete search history.

(56) References Cited

U.S. PATENT DOCUMENTS

2007/0041837 A1* 2/2007 Ide .................. F03D 7/0224
416/147
2008/0101930 A1* 5/2008 Bosche .............. F03D 7/0204
416/31
(Continued)

FOREIGN PATENT DOCUMENTS

CN 101248269 A 8/2008
CN 201991694 U 9/2011
(Continued)

OTHER PUBLICATIONS

International Search Report for PCT/DK2014/050200, dated Oct. 9, 2014.
Danish Search Report for PA 2013 70419, dated Mar. 6, 2014.

*Primary Examiner* — Woody A Lee, Jr.
(74) *Attorney, Agent, or Firm* — Patterson + Sheridan, LLP

(57) ABSTRACT

Improvements Relating to Wind Turbines A wind turbine apparatus and a method of operating said wind turbine to maintain the load on the rotor blade below a predetermined threshold level is provided. The method comprises: measuring load at a root end of the rotor blade; measuring an acceleration at a location on the rotor blade outboard from the root end, the acceleration being caused by transient loads acting on the rotor blade; and controlling the wind turbine based upon the measured load and the measured acceleration to maintain the load on the rotor blade below a predetermined threshold level.

20 Claims, 4 Drawing Sheets

(51) Int. Cl.
*F03D 17/00* (2016.01)
*F03D 7/04* (2006.01)

(52) U.S. Cl.
CPC ............ *F03D 17/00* (2016.05); *F03D 1/0675* (2013.01); *F05B 2260/821* (2013.01); *F05B 2270/331* (2013.01); *F05B 2270/332* (2013.01); *F05B 2270/804* (2013.01); *F05B 2270/807* (2013.01); *F05B 2270/808* (2013.01); *Y02E 10/721* (2013.01); *Y02E 10/723* (2013.01)

(56) References Cited

U.S. PATENT DOCUMENTS

| | | | |
|---|---|---|---|
| 2008/0317598 A1* | 12/2008 | Barbu | F03D 7/022 416/9 |
| 2010/0135801 A1 | 6/2010 | Melius | |
| 2012/0087792 A1 | 4/2012 | Cousineau et al. | |
| 2013/0174664 A1 | 7/2013 | Olesen | |

FOREIGN PATENT DOCUMENTS

| | | |
|---|---|---|
| CN | 102777318 A | 11/2012 |
| CN | 102966488 A | 3/2013 |
| WO | 0133075 A1 | 5/2001 |
| WO | 2009068035 A2 | 6/2009 |
| WO | 2009071882 A2 | 6/2009 |
| WO | 2011042369 A2 | 4/2011 |
| WO | 20111110179 A1 | 9/2011 |
| WO | 2012000509 A2 | 1/2012 |
| WO | 2013075720 A2 | 5/2013 |

* cited by examiner

WIND TURBINE OPERATING METHOD AND DEVICE BASED ON LOAD AND ACCELERATION MEASUREMENTS IN THE BLADE

BACKGROUND

The present invention relates to a wind turbine and to a method of operating a wind turbine that prevents excessive loads acting on the rotor blades.

Wind turbine rotor blades experience a significant level of dynamic loading during operation of the wind turbine. In part, this dynamic loading is exerted by the wind, and in particular, excessive transient loads can be caused by turbulence or gusts i.e. short periods of very high wind. Wind loading may cause extreme deflection of the blades and can result in severe stresses in the blades. Over the lifetime of the wind turbine (potentially 20 years or more), cyclic stress may cause the rotor blades to fail due to material fatigue.

The rotor blades must be robust and reliable in order to reduce the potential maintenance time and costs over the lifetime of the wind turbine. Therefore, modern wind turbines include a number of load sensors such as strain gauges for measuring the strain on the rotor blades. The measured strain on the rotor blades can be used to determine the stress experienced by the rotor blades through predetermined stress-strain relationships linked to the material and construction of the rotor blades. To prevent high stresses, the pitch of the rotor blades may be varied or the shape of the cross section of the rotor blades may be changed (e.g. using flaps). These protective actions are intended to reduce the wind loading on the rotor blades and hence reduce stresses in the rotor blades.

Generally, the strain gauges are fitted at the root end of the rotor blades, i.e. close to where the rotor blade is mounted to the hub of the wind turbine. A maximum strain limit is typically imposed such that if the measured strain reaches that limit, protective action is taken (such as varying the pitch or camber of the rotor blades) to reduce fatigue on the rotor blade and to prolong its life. However, this also has the adverse effect of reducing the overall energy capture by the wind turbine during periods of high wind.

In order to avoid damage to the blades caused by excessive loads, some wind turbines operate below a so-called 'safety strain limit', which is considerably lower than the maximum strain limit that the blades can tolerate without being damaged. In this case, protective actions to reduce the load on the blades are taken when the safety strain limit is reached (i.e. before the maximum strain limit is reached). This safety strain limit therefore provides a safety margin in which the wind turbine can operate without the possibility of the blades being damaged. However, if the blades are exposed to steady high winds without gusts or turbulence, the safety strain limit may be exceeded and protective actions taken, even though the steady wind loads would not cause the blades to exceed their maximum strain limit. In such cases, there is no risk of damage occurring, but the protective actions inevitably result in reduced energy capture.

There is a continual drive to increase the size and efficiency of wind turbines. As rotor blades become larger, they also become more flexible and are exposed to greater wind forces. There is therefore a need to develop increasingly-more sophisticated load monitoring and control systems for wind turbines that are capable of preventing damage from occurring to the blades whilst at the same time maximising the energy capture from the wind.

SUMMARY OF THE INVENTION

The inventor of the present invention has realized that one limitation associated with existing load detection systems is that when a high transient load due to turbulence or a strong gust is experienced near the tip of a rotor blade, the induced stress will take time to propagate to the root of the rotor blade for detection by the load sensors. Typically, the propagation time is of the order of a few hundred milliseconds, whereas it can take several seconds for the wind turbine to adjust its configuration to mitigate wind loading. Therefore, by the time the deflection and associated stresses are detected by the load detection system, the rotor blade may already have operated above its maximum strain limit for some time and damage may already have been caused to the blade before the load on the blade can be reduced through protective actions.

Against this background, the present invention provides a method of operating a wind turbine comprising at least one rotor blade, the method comprising: measuring load at a root end of the rotor blade; measuring an acceleration at a location on the rotor blade outboard from the root end, the acceleration being caused by transient loads acting on the rotor blade; and controlling the wind turbine based upon the measured load and the measured acceleration to maintain the load on the rotor blade below a predetermined threshold level.

This approach to operating the wind turbine allows the most appropriate configuration of the wind turbine to be used for the prevailing conditions (for example, steady wind or gusty wind), optimising energy capture of the rotor blade while preventing or reducing fatigue given the wind, turbulence and gust loads.

The accelerometer provides a near instantaneous indication of the movement of the outboard part of the blade due to transient loads caused by gusts and turbulence. Using this information, the wind turbine can react to such wind conditions more quickly than prior art wind turbines where there is an appreciable delay before loads on the outboard parts of the blade are recorded by the loads sensors at the root of the blade. The present method therefore enables the wind turbine to operate safely close to the predetermined load threshold level, thereby maximising energy capture in a range of wind conditions.

Preferably, the method comprises a further step of determining a transient load on the rotor blade attributable to the acceleration. This allows manipulation of the measurements from the accelerometer to be directly compared and/or combined with the measured load.

Preferably, the method comprises a further step of determining a predicted load on the rotor blade by combining the measured load at the root end of the rotor blade with the transient load. The wind turbine can then be controlled based on the predicted load. The predicted load is a forecast of the measured load at the root end that is expected to be experienced by the rotor blade taking account of the transient load.

The wind turbine may be controlled by taking into account the predicted load to prevent damage due to excessive load on the rotor blade and/or maximise energy capture of the rotor blade. If the predicted load on the rotor blade is above the predetermined threshold level, the wind turbine may be controlled to reduce the load on the rotor blade. Additionally or alternatively, if the predicted load on the rotor blade is below the predetermined threshold level, the wind turbine may be controlled to increase the energy capture of the rotor blade.

Preferably, both the magnitude and the direction of the acceleration are measured. The direction of the measured acceleration may be used to predict whether the transient load will increase or decrease the load measured at the root of the blade. For example, if the transient load due to gusts or turbulence acts in a direction opposite to the prevailing steady wind direction, then it may actually temporarily alleviate some of the load on the rotor blade.

In an embodiment, the method further comprises a step of determining a movement of the blade based on the measured acceleration. The movement may be along a straight line or along a more complicated trajectory. In particular a twist of the blade may be determined, and also a magnitude of the twist may be determined. By determining the presence of a twist a more sophisticated control action may be applied to mitigate the load exposure of the blade. In a situation where the blade does not twist the actual angle of attack is different from the situation where the blade is twisting. This may be used to determine an even better pitch response to the specific load situation.

If the transient load is predicted to decrease the load measured at the root of the rotor blade, the wind turbine may be controlled to increase the energy capture of the rotor blade. Alternatively or additionally, if the transient load is predicted to increase the load measured at the root of the rotor blade, the wind turbine may be controlled to reduce the load on the rotor blade. Actions to reduce the load on the blade are generally only required when the wind turbine is operating near the predetermined threshold level.

Preferably, the wind turbine is controlled to increase the energy capture of the rotor blade and/or decrease the load on the rotor blade by adjusting a pitch angle of the rotor blade. Alternatively or additionally, the wind turbine may be controlled by varying the shape of the rotor blade and/or actuating a flap on the rotor blade to achieve the desired energy capture and load on the rotor blade.

The invention further provides a wind turbine comprising: at least one rotor blade; a load sensor located at a root end of the rotor blade; an accelerometer located on the rotor blade outboard from the root end; and a controller configured to control the wind turbine based upon the measured load and the measured acceleration to maintain the load on the rotor blade below a predetermined threshold level.

Preferably, the accelerometer is located near the tip of the rotor blade. As the rotor blade is flexible, the tip end of the rotor blade will experience the greatest deflection due to transient loads, and hence experience the greatest acceleration. Positioning the accelerometer near the tip end is therefore beneficial as it increases the output range of the accelerometer. It also increases the time interval between the acceleration due to transient loads being measured and the transient load propagating to the root end of the rotor blade.

In a preferred embodiment, the accelerometer is located inside the rotor blade to protect it from the environment and prevent degradation of the accelerometer. The accelerometer may be attached to the inner surface of the rotor blade shell, the surface of an internal structural member (for example, a spar or a rib of the rotor blade) or embedded within the shell of the rotor blade.

Preferably, the accelerometer is an optical accelerometer, for example comprising a micro-optical shutter modulator or a mechanical mass coupled to a fibre Bragg grating. Additionally or alternatively, the accelerometer is connected to the controller via one or more optical fibres that extend along the length of the rotor blade. The controller may be located remotely from the rotor blade, for example in the hub, the nacelle or the tower of the wind turbine. The connection between the accelerometer and the controller may be direct or via a light source and/or light detector. The light source may comprise one or more LEDs, lasers, halogen, metal halide light sources or any other light source.

The use of an optical accelerometer and/or the optical fibre connection(s) to the remotely located controller is beneficial because they eliminate metallic components from the rotor blade and therefore reduce the susceptibility of the rotor blade to lightning strikes.

In embodiments, the accelerometer is an accelerometer system comprising spatially separated sub-accelerometers. For example two accelerometers may be used to detect a twist of the outer part of the blade, e.g. one accelerometer mounted near the leading edge of the blade and one accelerometer mounted near the trailing edge of the blade. A measurement of the twist of the blade may be based on a subtraction of the signals from the two accelerometers.

A twist measurement may also be determined by use of a gyroscope, and to this end the accelerometer or accelerometer system may comprise a gyroscope.

Preferably, the wind turbine comprises a plurality of accelerometers arranged respectively at spaced apart intervals along the length of the rotor blade. With a greater number of accelerometers, the determination of the transient load is more accurate.

In a preferred embodiment, the load sensor is an optical load sensor, for example comprising a fibre Bragg grating. The use of an optical load sensor is beneficial for reducing the susceptibility of the rotor blade to lightning strikes as described above. In general, other types of load sensors may be used, e.g. electrical strain sensors.

In order to control the configuration of the wind turbine based upon the measured load and the measured acceleration to maintain the load on the rotor blade below a predetermined threshold level, the wind turbine preferably comprises means for changing the load on the blade.

Therefore, preferably, the wind turbine comprises a pitch drive mechanism for adjusting the pitch angle of the rotor blade. The controller may be configured to adjust a pitch angle of the rotor blade, to increase the energy capture of the blade and/or decrease the load on the rotor blade.

Alternatively or additionally, the rotor blade comprises an actuator for controlling a flap or otherwise changing the shape of the rotor blade. The controller may be configured to vary the camber of the rotor blade, and/or actuate the flap on the rotor blade, to increase the energy capture of the blade and/or decrease the load on the rotor blade.

Preferably, the wind turbine described above is used in a wind farm.

Optional and preferred features described above in relation to the invention when expressed in terms of an apparatus apply equally to the invention when expressed in terms of a method, and vice versa. And in general the various aspects and embodiments of the invention may be combined and coupled in any way possible within the scope of the invention.

BRIEF DESCRIPTION OF THE DRAWINGS

In order that the invention may be more readily understood, embodiments of the invention will now be described in more detail, by way of example only, and with reference to the following figures in which.

DETAILED DESCRIPTION OF THE PREFERRED EMBODIMENTS

Figure 1:
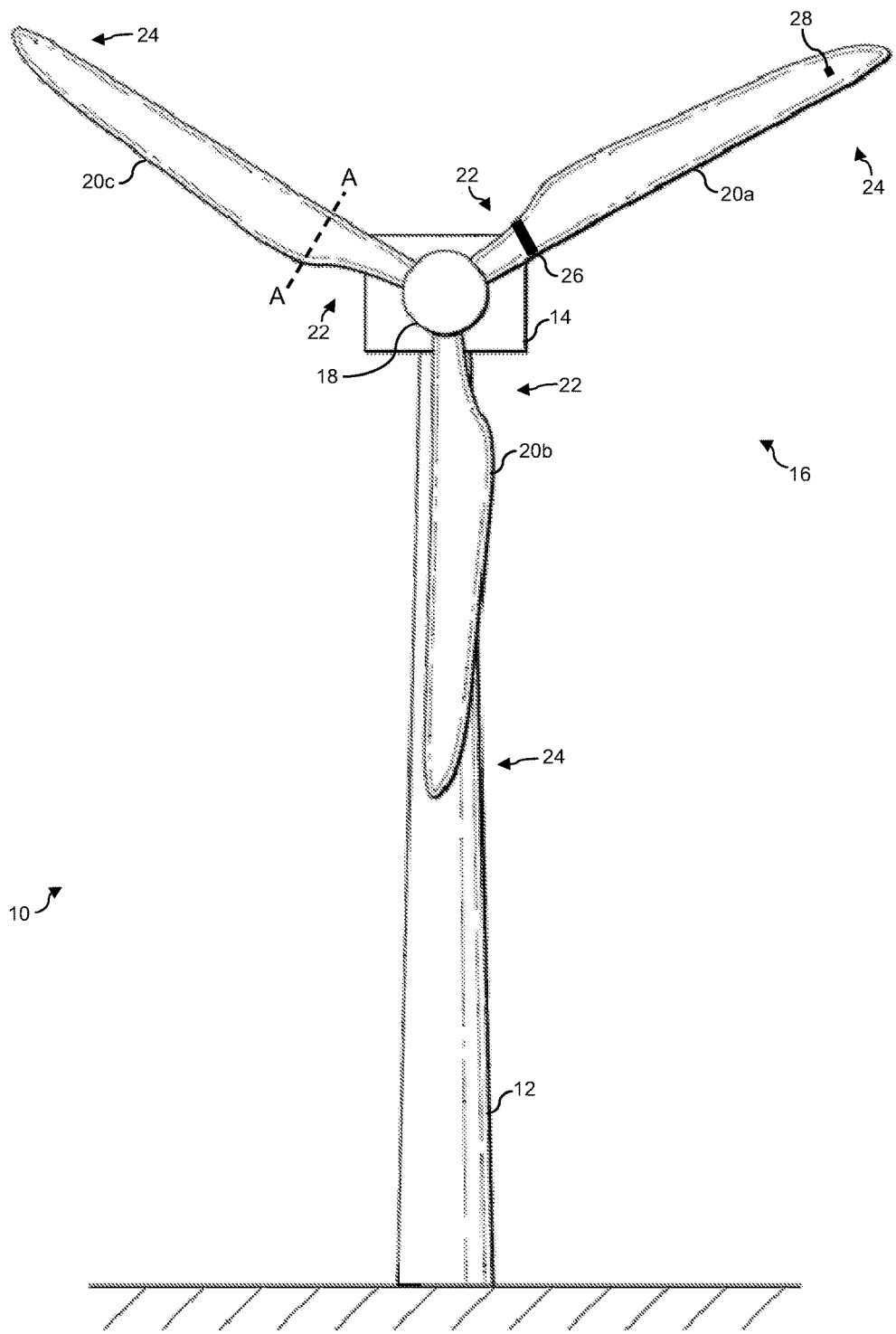
FIG. 1 is a schematic view of a wind turbine according to an embodiment of the present invention.

FIG. 1 shows a wind turbine 10 comprising a tower 12 on which a nacelle 14 is supported. A rotor 16 is mounted to the front of the nacelle 14. The rotor 16 comprises a hub 18 on which three equally-spaced rotor blades 20a, 20b, 20c are mounted. The rotor 16 includes a blade pitch system capable of varying the pitch angle of each rotor blade 20a, 20b, 20c independently, for example using an electric or hydraulic blade pitch drive.

The rotor blades 20a, 20b, 20c comprise an outer shell defining a substantially hollow interior. The blades each have a substantially solid tip region, which comprises the outermost 1-2 meters of the blade. The outer shell is primarily constructed of glass fibre reinforced composite materials. The rotor blades 20a, 20b, 20c each have a substantially cylindrical cross section at their root end 22. The cross section smoothly transitions to an airfoil profile at a maximum chord position as indicated by the line A-A. The chord then progressively decreases towards the tip 24 of the rotor blades 20a, 20b, 20c. The rotor blades 20a, 20b, 20c also steadily taper in thickness along their length moving from the root 22 towards the tip 24.

A load sensing system 26 is located near a root end 22 of the rotor blade 20a. In accordance with the present invention, an accelerometer 28 is located outboard of the load sensing system 26, near the tip 24 of the rotor blade 20a.

Figure 2:
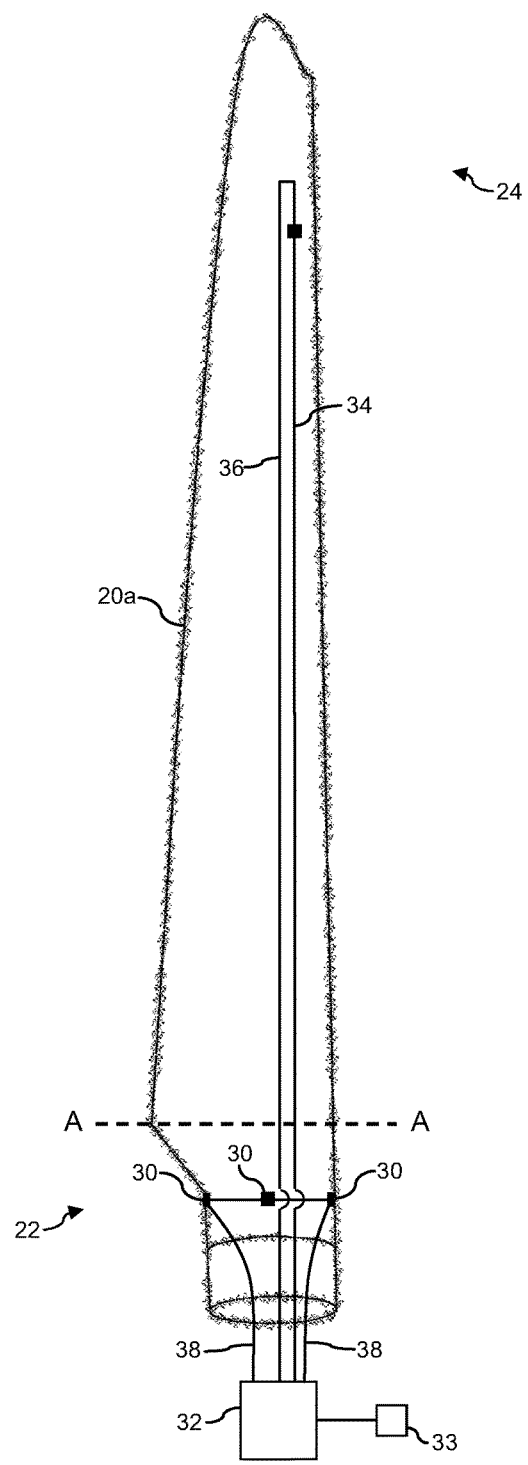
FIG. 2 is a schematic view of a rotor blade of the wind turbine shown in FIG. 1.

FIG. 2 shows the rotor blade 20a in more detail. The load sensing system 26 comprises four load sensors 30, three of which are visible in the figure. The four load sensors 30 are equally-spaced circumferentially around the root end 24 of the rotor blade 20a, and are mounted on the inner surface of the rotor blade shell to protect them from the environment. In other embodiments, the load sensors 30 may be mounted on the outer surface of the shell or embedded within the shell.

The load sensors 30 are configured to measure the mechanical deformation of the root end of the blade. In this embodiment, the load sensors 30 are optical strain gauges such as fibre Bragg gratings comprising equally spaced reflection points in the core of the optical fibre that reflect different wavelengths of light under different levels of strain.

In this example, the accelerometer 28 near the tip 24 of the rotor blade 20a is mounted to the inner surface of the rotor blade shell where the rotor blade is substantially hollow (i.e. approximately 1-2 meters from the tip of the blade), and is arranged to measure acceleration substantially in the direction of the lift forces acting on the rotor blade (i.e. the flapwise direction). The accelerometer 28 is an optical accelerometer, for example comprising a micro-optical shutter modulator or a mechanical mass coupled to a fibre Bragg grating.

In the figure, only a single optical accelerometer 28 is illustrated. In general other and further types of accelerometers may be used. For example, an accelerometer system may be used comprising spatially separated sub-accelerometers, e.g. a duplicate optical system with one part being positioned at the leading edge of the blade, and the other part being positioned at the trailing edge of the blade. Also the accelerometer may comprise a gyroscope.

In other embodiments, a plurality of accelerometers may be arranged along the span of the rotor blade 20a to provide the controller with more detailed information about the acceleration of different parts of the rotor blade 20a.

As wind turbines are very tall structures, they are susceptible to lightning strikes that may cause damage to the wind turbine 10. The use of optical load sensors and accelerometers eliminates metallic or electrically conductive components in exposed parts of the rotor, thereby reducing the vulnerability of the rotor blade 20a to lightning strikes.

An optoelectronic suite 32 is located remote from the rotor blade 20a, for example in the nacelle 14 or the hub 18 of the wind turbine 10. The optoelectronic suite 32 and the blade pitching system of the wind turbine are connected to a controller 33.

The accelerometer 28 is connected to the optoelectronic suite 32 by two optical fibres 34, 36. The first optical fibre 34 carries light from the optoelectronic suite 32 and the second optical fibre 36 carries light to the optoelectronic suite 32. The optoelectronic suite 32 comprises a light source connected to the first optical fibre 32, and a light detector connected to the second optical fibre 34.

The four load sensors 30 are connected in series with the optoelectronic suite 32 by optical fibres 38 as is conventional in the art. The optoelectronic suite 32 further comprises a light source connected to the first load sensor in the series, and a light detector connected to the last load sensor in the series.

The controller 33 includes a memory on which control software is stored, and a processor to run the control software. The control software governs the operation of the accelerometer 28, load sensors 30 and blade pitching system, and is configured with a maximum load limit, imposed to prevent fatigue in the rotor blade 20a. As will be described in more detail later, the data from the accelerometer 28 enables the timely detection of gust loads at the tip 24 of the rotor blade 20a, i.e. before the induced stress caused by the gust load propagates to the root 22 of the blade where it can be detected by the load sensors 30.

Figure 3:
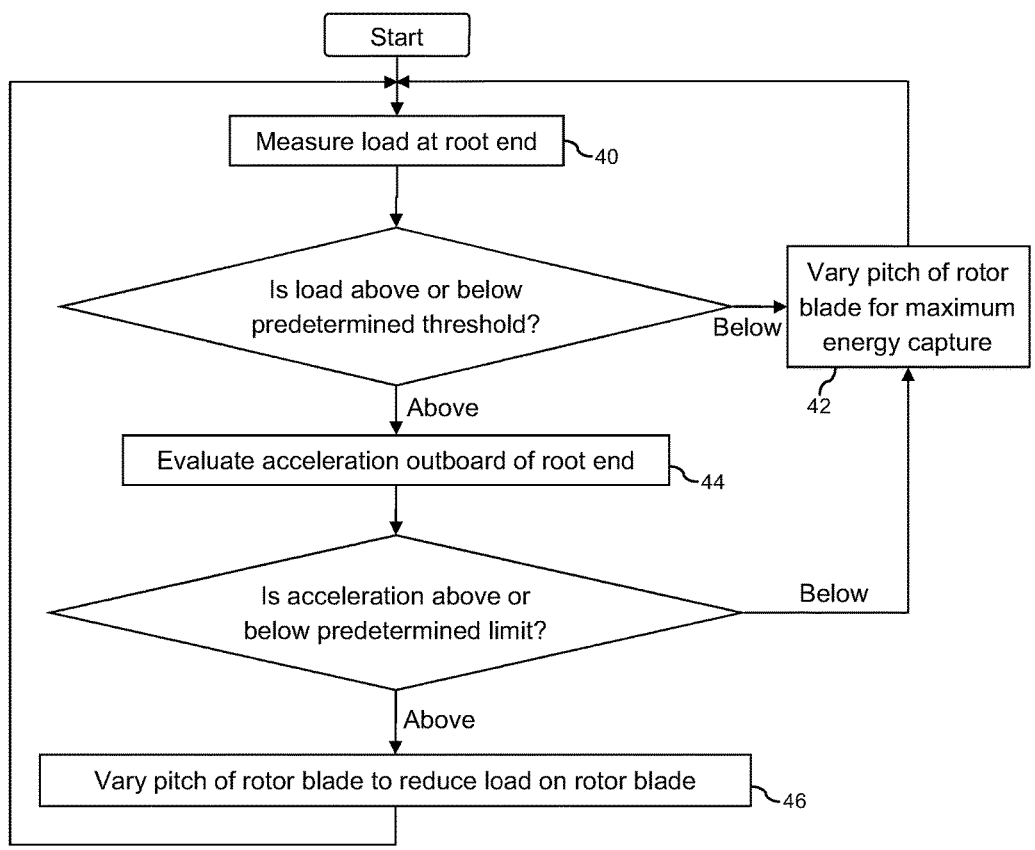
FIG. 3 is a flowchart describing a method of operating a wind turbine to prevent damage from occurring to the rotor blades, according to an embodiment of the present invention.

FIG. 3 shows an example method of operating the wind turbine 10. In Step 40, the load sensors 30 measure the load experienced at the root of the rotor blade 20a and the measured load data are received by the controller 33. If the measured load is below a predetermined threshold (that is lower than the maximum load limit), the controller 33 instructs the blade pitching system to vary the angle of the rotor blade 20a in order to maximise the energy capture from the wind in Step 42. For example, the pitch angle may be adjusted to the angle corresponding to the maximum lift coefficient for the rotor blade 20a.

If the wind load is above the predetermined threshold, the rotor blade 20a may be operating close to its maximum load limit. In this case, in Step 44, the controller 33 evaluates the measured acceleration data. If the measured acceleration is below a predetermined limit, then there is little movement of the rotor blade tip 24 due to gust loads, and it is determined that the load will not exceed the maximum load limit. In this case, the controller 33 instructs the blade pitching system to vary the angle of the rotor blade 20a in order to maximise the energy capture of the rotor blade 20a from the wind in Step 42.

However, if the measured acceleration near the tip 24 of the rotor blade 20a is above the predetermined limit, then there is significant movement of the tip 24 due to gusts and there is therefore a risk that the load may exceed the maximum load limit. In this scenario, the controller 33 instructs the blade pitching system to vary the angle of the rotor blade 20a to reduce the load on the rotor blade from the wind in Step 46. This prevents gusts from causing the rotor blade 20a to exceed its maximum load limit. For example, in extreme cases of high load at the root end 22 coupled with significant movement at the tip 24, the pitch angle may be changed so that the rotor blade 20a is parallel to the wind direction (i.e. feathering the rotor blade) to minimise the load on the rotor blade 20a and prevent damage.

The process outlined in FIG. 3 is continuously carried out by the controller 33 during operation of the wind turbine such that after the pitch is varied in either Steps 42 or 46, the process returns to Step 40.

The pitch of the rotor blade in either Step 42 or 46 is chosen from a lookup table and depends on the parameters (e.g. magnitude and direction) of the measured load and the measured acceleration. In the lookup table, for each combination of parameters, there is an associated pitch angle that is optimum for energy capture of the rotor blade while preventing or reducing fatigue given the wind, turbulence and gust loads.

Gusts are not necessarily detrimental to the load on the rotor blades 20a, 20b, 20c. Depending upon the direction of the gusts, they may in some cases actually serve to alleviate loads on the rotor blades 20a, 20b, 20c, for example in the case of gusts in the opposite direction to the steady wind flow direction. By measuring the magnitude and direction of accelerations near the tip of the blade, it is possible to predict the load at the root end 22 of the rotor blade 20a before the load propagates to the root of the blade for detection by the root-mounted load sensors.

Figure 4:
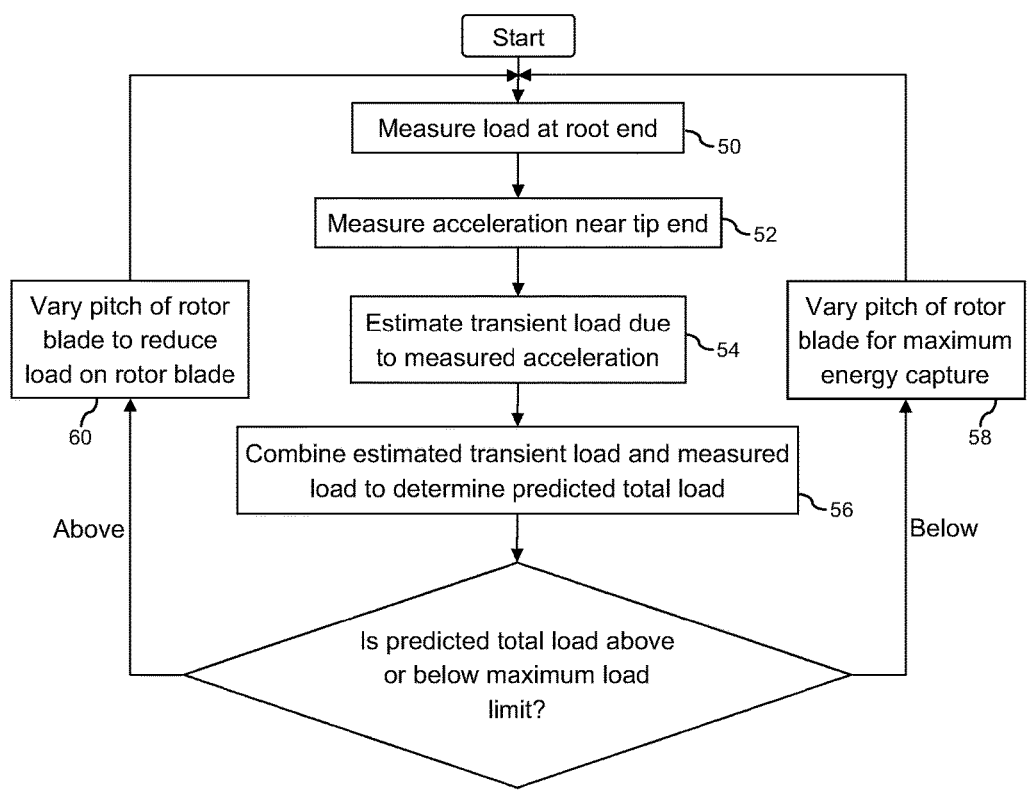
FIG. 4 is a flowchart describing a method of operating a wind turbine to prevent damage from occurring to the rotor blades, according to another embodiment of the present invention.

FIG. 4 shows another example method of operating the wind turbine 10, in which the system is configured to predict the expected loads on the blade based upon the magnitude and direction of the measured acceleration.

Referring to FIG. 4, in Step 50, the load sensors 30 measure the load experienced at the root 22 of the rotor blade 20a and the measured load data are received by the controller 33. In Step 52, the accelerometer 28 measures the magnitude and direction of the acceleration experienced at the tip 24 of the rotor blade 20a due to transient loads, and the measured acceleration is received by the controller 33. The controller 33 then estimates a transient load from the measured acceleration in Step 54. The estimated transient load is a prediction of the load that the measured acceleration would cause on the root end 22 of the rotor blade 20a due to gusts if no action was taken. The estimated transient load is chosen from a lookup table depending on the magnitude and direction of the measured acceleration.

The estimated transient load is combined with the measured load in Step 56 to determine a predicted total load. As it can take around 200 ms or longer for loads near the tip of the blade to propagate to the root of the blade, the predicted total load is the load that the root-mounted load sensors are expected to record in the next 200 ms or so.

By forecasting the load that is expected to be recorded in the next 200 ms or so, the wind turbine is able to take action to avoid excessive loads more quickly than in prior art systems. For example, if the predicted load is sufficient to warrant protective measures such as pitching the blades out of the wind, the pitch mechanism may be activated 200 ms more quickly in this example compared to prior art systems that rely solely on readings from the root-mounted load sensors. This reduces the possibility of the blades being damaged before protective measures can be taken.

If the predicted total load is below the maximum load limit, the controller 33 instructs the blade pitching system to vary the angle of the rotor blade 20a in order to maximise the energy capture from the wind in Step 58. This situation may arise in moderate winds or in high winds without gusts, but may also arise if the acceleration measured near the tip of the blade indicates that the gusts are in a direction that would serve to alleviate some of the load on the blade, in which case the predicted total load may be lower than the currently-measured load at the root end 22 even when gusts are acting on the blade of the blade.

If the predicted total load is above the maximum load limit, there is a risk that the load may exceed the maximum load limit. In this scenario, the controller 33 instructs the blade pitching system to vary the angle of the rotor blade 20a to reduce the load on the rotor blade from the wind in Step 60. This reduces the load on the rotor blade 20a before the maximum load limit is exceeded.

The process outlined in FIG. 4 is continuously carried out by the controller 33 during operation of the wind turbine such that after the pitch is varied in either Steps 58 or 60, the process returns to Step 50.

As in the example of FIG. 3, the pitch of the rotor blade in either Step 58 or 60 is chosen from a lookup table and depends on the parameters (e.g. magnitude and direction) of the measured load and the measured acceleration.

Many modifications may be made to the above examples without departing from the scope of the present invention as defined in the accompanying claims.

For example, instead of using a lookup table that correlates the measured parameters with the prevention actions, algorithms may be used to determine the associated pitch angle that is optimum.

In other examples of the invention, the rotor blades 20a, 20b, 20c may comprise adjustable flaps that change the shape of the rotor blade. In such examples, the camber may be adjusted to change the load on the rotor blade, instead of or in addition to adjusting the pitch. Other mechanisms of changing the load on the rotor blades 20a, 20b, 20c are readily apparent to the skilled person, for example, boundary layer control or leading edge slats.

What is claimed is:

1. A method of operating a wind turbine comprising at least one rotor blade, the method comprising:
   measuring load at a root end of the rotor blade;
   measuring an acceleration at a location on the rotor blade outboard from the root end, the acceleration being caused by transient loads acting on the rotor blade;
   determining a transient load on the rotor blade attributable to the acceleration;
   determining a predicted load on the rotor blade by combining the measured load at the root end of the rotor blade with the transient load; and
   controlling the wind turbine based upon the measured load and the measured acceleration to maintain the load on the rotor blade below a predetermined threshold level.

2. The method of claim 1, further comprising controlling the wind turbine to reduce the load on the rotor blade if the predicted load on the rotor blade is above the predetermined threshold level.

3. The method of claim 1 wherein controlling the wind turbine further comprises controlling the wind turbine to increase an energy capture of the rotor blade if the predicted load on the rotor blade is below the predetermined threshold level.

4. The method of claim 1, further comprising measuring both a magnitude and a direction of the acceleration.

5. The method of claim 1, further comprising determining a movement of the blade based on the measured acceleration.

6. The method of claim 4, further comprising predicting from the direction of the acceleration if a transient load will increase or decrease the load measured at the root of the rotor blade.

7. The method of claim 6, wherein controlling the wind turbine further comprises controlling the wind turbine to:
increase an energy capture of the rotor blade if the transient load is predicted to decrease the load measured at the root of the rotor blade; or
reduce the load on the rotor blade if the transient load is predicted to increase the load measured at the root of the rotor blade.

8. The method of claim 7, wherein controlling the wind turbine to increase the energy capture of the rotor blade or decrease the load on the rotor blade, comprises: adjusting a pitch angle of the rotor blade, and/or varying a shape of the rotor blade, and/or actuating a flap on the rotor blade.

9. A wind turbine comprising:
at least one rotor blade;
a load sensor located at a root end of the rotor blade;
an accelerometer located on the rotor blade outboard from the root end; and
a controller configured to:
determine a transient load on the rotor blade attributable to the acceleration;
determine a predicted load on the rotor blade by combining a measured load at the root end of the rotor blade with the transient load; and
control the wind turbine based upon the measured load and a measured acceleration to maintain a load on the rotor blade below a predetermined threshold level.

10. The wind turbine of claim 9, wherein the accelerometer is located near a tip of the rotor blade.

11. The wind turbine of claim 9, wherein the accelerometer is located inside the rotor blade.

12. The wind turbine of claim 9, wherein the accelerometer is an optical accelerometer.

13. The wind turbine of claim 12 wherein the accelerometer is connected to the controller via one or more optical fibers that extend along a length of the rotor blade.

14. The wind turbine of claim 9, wherein the accelerometer is an accelerometer system comprising spatially separated sub-accelerometers.

15. The wind turbine of claim 9, wherein the accelerometer comprises a gyroscope.

16. The wind turbine of claim 9, wherein the accelerometer comprises a plurality of accelerometers arranged respectively at spaced apart intervals along a length of the rotor blade.

17. The wind turbine of claim 9, wherein the load sensor is an optical load sensor.

18. The wind turbine of claim 9, wherein the wind turbine further comprises a pitch drive mechanism for adjusting a pitch angle of the rotor blade, and wherein the controller is configured to adjust a pitch angle of the rotor blade, to increase an energy capture of the rotor blade and/or decrease the load on the rotor blade.

19. The wind turbine of claim 9, wherein the rotor blade comprises an actuator for controlling a flap or otherwise changing a shape of the rotor blade, and wherein the controller is configured to vary a camber of the rotor blade, and/or actuate the flap on the rotor blade, to increase an energy capture of the rotor blade or decrease the load on the rotor blade.

20. A wind farm comprising a plurality of wind turbines as claimed in claim 9.

* * * * *